A. NEWTON-SMITH.
PICKING MECHANISM OF LOOMS.
APPLICATION FILED JAN. 3, 1918.
1,301,298. Patented Apr. 22, 1919.
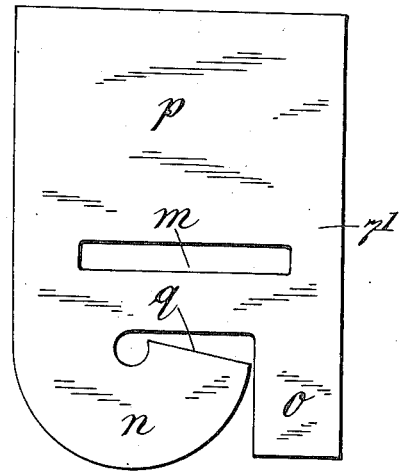
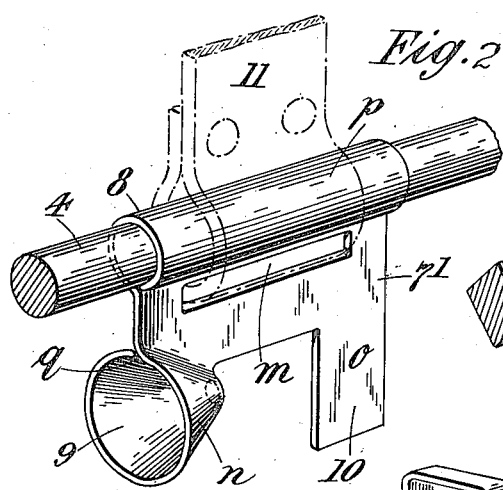
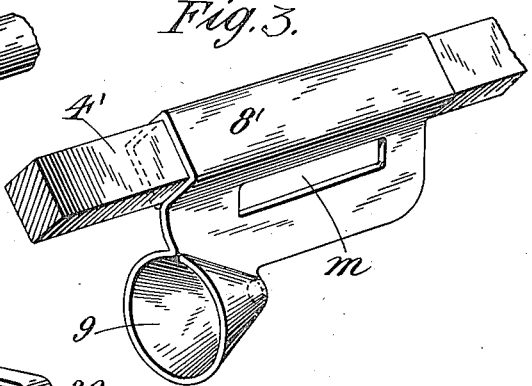
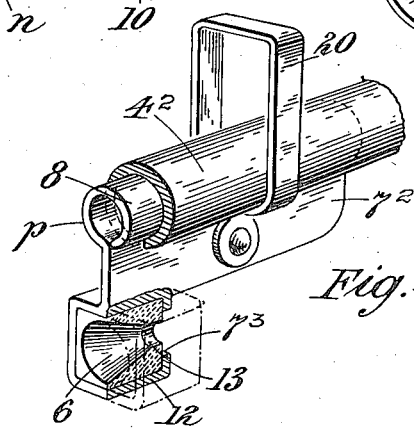
Inventor,
Arthur Newton-Smith.
Per. John E Raworth
Atty.

UNITED STATES PATENT OFFICE.

ARTHUR NEWTON-SMITH, OF WESTMINSTER, ENGLAND.

PICKING MECHANISM OF LOOMS.

1,301,298.  Specification of Letters Patent.  Patented Apr. 22, 1919.

Application filed January 3, 1918. Serial No. 210,155.

*To all whom it may concern:*

Be it known that I, ARTHUR NEWTON-SMITH, a subject of the King of Great Britain and Ireland, and resident of Westminster, England, have invented new and useful Improvements in or in Connection with the Picking Mechanism of Looms, of which the following is a specification.

The invention relates to improvements in or in connection with the picking mechanism of looms, and is applicable to, or usable in connection with, overtype picking mechanism, and also with undertype picking mechanism of the type or class in which the picker is connected with the picking stick by a picking strap and is thus indirectly acted upon by the picking stick.

The invention has for its object to provide improvements in pickers which shall overcome or minimize objections that pertain to pickers as now constructed.

Picking mechanism of looms, in accordance with this invention, comprises in combination, a picker without a picker foot mounted on a picking spindle of such cross section that angular movement of the picker in relation thereto is prevented, and a picking strap attached to the picker either around the picking spindle or below the picking spindle and above the shuttle buffer.

As will be obvious, the invention can be carried into effect in various ways. In the accompanying drawings there are shown, by way of example, several constructions of pickers embodying and in accordance with this invention.

Figure 1 is a plan view of a plate used in the manufacture of another construction of picker, which is shown in Fig. 2 in perspective view;

Fig. 3 is also a perspective view, and shows a modified form of the picker illustrated in Fig. 2;

Fig. 4 is a further perspective view, and shows a modified form of the picker illustrated in Fig. 3.

In the manufacture of the picker shown in Fig. 2, a metal plate 7' (Fig. 1), preferably rectangular in shape, is subjected to operations which result in the formation of a slot $m$ and two portions $n$, $o$. When thus far treated, the plate is subjected to another operation by which the portion $p$ above the slot $m$ is bent into the form of a tube, circular in cross section and of an internal diameter such that the tubular portion can be passed on to the picking spindle 4, on which it will be capable of movement relatively thereto. If the plate were now mounted by means of the tubular portion 8 upon the picking spindle 4, the two portions $n$, $o$ would form free ends extending vertically toward the fly plate, but before the plate is so mounted, the portion $n$ is bent into the form of a truncated cone 9, which cone is designed and intended to receive the impact of the shuttle and act as a buffer. The portion $o$ forms the picker foot 10. When the plate 7' has been treated as described, the slot $m$ comes just below the tubular portion 8; one end of the picking strap 11 is passed through the slot $m$, turned upward and fastened to a portion of the strap above the tubular portion 8. The picking strap is thus fastened around the tubular portion 8, is prevented thereby from rubbing on the picking spindle 4, and the picking effort is applied coaxially with the picking spindle 4. The edge $q$ of the portion $n$ of the plate 7' (Fig. 1) when the cone 9 is formed, is not, in the construction illustrated, attached to the other portion of the part $n$ so that when the shuttle strikes the cone 9, it (the cone) will yield to the impact, as a spring and act as a buffer. Alternatively, the part $q$ may be welded to the portion $n$. As the cone 9 is truncated, the metal tip of the shuttle is protected from injury as it passes through the opening at the inner end of the cone, which opening also acts as a vent for the escape of air that is trapped by the shuttle when it enters the cone. For the same purpose, the cone 9 may be pierced with small holes and to soften the impact of the shuttle, its outer or larger end suitably shaped so as to hold securely soft metal or other material. In Fig. 2 the picking spindle 4 is shown as circular in cross section; in Fig. 3 the picking spindle 4' is shown as rectangular in cross section, the tubular portion 8' of the picker being shaped to correspond. With a picker mounted upon a picking spindle of rectangular cross section, the picker foot will be unnecessary as the shape of the picking spindle will prevent angular movement of the picker in relation to the picking spindle.

Fig. 4 shows a further modification of picker and picking spindle in which, instead of a rectangular picking spindle, the picking spindle $4^2$ is in the form of a slotted tube and the portion $p$ of the plate $7^2$ is bent or shaped to fit within the tube. A portion of the picker extends through said slot, and it and the slot serve the same purposes as the picker foot and the slot or groove in the fly plate. In the construction of picker shown in Fig. 4, a loop 20 is attached at its ends to the opposite sides of the part of the picker that passes through the slot in the picking spindle $4^2$, and the picking strap is attached to the loop 20 above the picking spindle $4^2$. With this arrangement the picking effort is applied below the picking spindle and as near as possible to the shuttle.

Instead of the picker being provided with a buffer to receive the impact of the shuttle formed as a cone as in Figs. 2 and 3, said buffer may be made rectangular in cross section as shown in Fig. 4 at 12, and be filled with leather or other suitable material 6 to receive and soften the impact of the shuttle; such leather or other material 6 may be hollowed out interiorly as shown, but whether it be hollowed out or not, it is provided with a hole 13 and the end wall of the picker leather or buffer holder 12 is formed with a coaxial hole $7^3$, both said holes acting to prevent injury to the shuttle tip and as vents for the escape of air trapped between the shuttle and the picker leather or buffer 6.

Having now particularly described and ascertained the nature of my said invention and in what manner the same is to be performed, I declare that what I claim is:—

1. A picking mechanism for looms, comprising in combination, a picking spindle, a picker consisting of a piece of metal bent to conform with the contour of said spindle, said picker being slidable along said spindle, and being provided with an integral extension, and a portion of the extension being bent to form a buffer.

2. A picking mechanism for looms, comprising in combination, a picking spindle of non-circular cross section, a picker without a picker foot mounted on said spindle and having a portion in engagement with the spindle and conforming to the contour thereof, whereby angular movement of the picker with respect to the spindle is prevented.

3. A picking mechanism for looms, comprising in combination, a picking spindle, a picker without a picker foot, said picker being slidable along said spindle and having a portion arranged to engage a portion of the spindle for preventing angular movement of the picker with respect to the spindle.

4. A picking mechanism for looms, comprising in combination, a picking spindle of non-circular cross section, a picker without a picker foot mounted on said spindle and having a portion in engagement with the spindle and conforming to the contour thereof whereby angular movement of the picker with respect to the spindle is prevented, and a shuttle buffer carried by the picker below the spindle.

5. A picking mechanism for looms, comprising in combination, a picking spindle of non-circular cross section, a picker without a picker foot mounted on said spindle and having a portion in engagement with the spindle and conforming to the contour thereof whereby angular movement of the picker with respect to the spindle is prevented, a shuttle buffer carried by the picker below the spindle, and a picking strap attached to the picker.

6. A picking mechanism for looms, comprising in combination, a picking spindle of non-circular cross section, a picker without a picker foot mounted on said spindle and having a portion in engagement with the spindle and conforming to the contour thereof whereby angular movement of the picker with respect to the spindle is prevented, a shuttle buffer carried by the picker below the spindle, and a picking strap attached to the picker around the picking spindle.

Dated this 11th day of December, 1917.

ARTHUR NEWTON-SMITH.